(12) United States Patent
Reichenbach et al.

(10) Patent No.: US 12,344,373 B2
(45) Date of Patent: Jul. 1, 2025

(54) AUTONOMOUS AERIAL IMAGING AND ENVIRONMENTAL SENSING OF A DATACENTER

(71) Applicant: Google LLC, Mountain View, CA (US)

(72) Inventors: Joseph Neil Reichenbach, Snoqualmie, WA (US); Cedric Del Richard Chenal, Kirkland, WA (US)

(73) Assignee: Google LLC, Mountain View, CA (US)

( * ) Notice: Subject to any disclaimer, the term of this patent is extended or adjusted under 35 U.S.C. 154(b) by 169 days.

(21) Appl. No.: 17/744,155

(22) Filed: May 13, 2022

(65) Prior Publication Data

US 2023/0365257 A1 Nov. 16, 2023

(51) Int. Cl.

| | |
|---|---|
| *G06V 20/17* | (2022.01) |
| *B64C 39/02* | (2023.01) |
| *G01C 21/20* | (2006.01) |
| *G05D 1/00* | (2006.01) |
| B64U 101/30 | (2023.01) |

(52) U.S. Cl.
CPC ............ *B64C 39/024* (2013.01); *G01C 21/20* (2013.01); *G05D 1/101* (2013.01); *G06V 20/17* (2022.01); *B64U 2101/30* (2023.01)

(58) Field of Classification Search
CPC ...... B64C 39/024; G01C 21/26; G01C 21/20; G06V 20/17; G05D 1/101; B64U 2101/30
See application file for complete search history.

(56) References Cited

U.S. PATENT DOCUMENTS

| | | | |
|---|---|---|---|
| 9,964,951 B1 * | 5/2018 | Dunn | G06V 10/245 |
| 2017/0225336 A1 * | 8/2017 | Deyle | B25J 11/008 |

(Continued)

FOREIGN PATENT DOCUMENTS

| | | | |
|---|---|---|---|
| KR | 10-2020-0114858 | 10/2020 | |
| WO | WO 2019220273 | 11/2019 | |
| WO | WO-2019220273 A1 * | 11/2019 | B64D 47/08 |

OTHER PUBLICATIONS bestbuy.com [online], "DJI—Mavic Mini Quadcopter with Remote Controller—Gray," Jul. 31, 2020, retrieved on Aug. 11, 2022, retrieved from URL<https://www.bestbuy.com/site/dji-mavic-mini-quadcopter-with-remote-controller-gray/6383451.p?skuId=6383451>, 3 pages.

(Continued)

*Primary Examiner* — Kenneth J Malkowski
(74) *Attorney, Agent, or Firm* — Fish & Richardson P.C.

(57) ABSTRACT

Methods, systems and apparatus, including computer programs encoded on computer storage medium, for autonomous aerial imaging and environmental sensing of a datacenter. In one aspect a method includes executing, within a datacenter and by an unmanned aerial vehicle (UAV) in data communication with a server, a connectivity-enabled navigation process to collect data from the datacenter; determining, during execution of the connectivity-enabled navigation process and by the UAV, that connection to the server is lost so that the connectivity-enabled navigation process cannot be continued; and in response to determining that connection to the server is lost, executing, by the UAV, an autonomous navigation process until the connection to the server is recovered, wherein the autonomous navigation process navigates the datacenter using visual tags positioned in the datacenter.

17 Claims, 7 Drawing Sheets

(56) References Cited

U.S. PATENT DOCUMENTS

| | | | | |
|---|---|---|---|---|
| 2018/0156614 A1* | 6/2018 | Michini | ............... | G01C 15/02 |
| 2020/0012829 A1* | 1/2020 | Davidson | ............ | G05D 1/0234 |
| 2020/0096594 A1* | 3/2020 | Virtej | ................ | G05D 1/0022 |
| 2020/0174490 A1* | 6/2020 | Ogale | ................ | G06N 3/045 |
| 2020/0184706 A1* | 6/2020 | Speasl | ............... | H04L 9/0643 |
| 2023/0141818 A1* | 5/2023 | Cho | .................. | G05D 1/0676 |
| | | | | 701/3 |

OTHER PUBLICATIONS cnet.com [online], "Amazon's new Ring camera is actually a flying drone—for inside your home," Oct. 8, 2020, retrieved on Aug. 11, 2022, retrieved from URL<https://www.cnet.com/home/security/amazons-new-ring-camera-is-actually-a-flying-drone-for-inside-your-home/>, 4 pages.

Extended European Search Report in European Appln. No. 22199227.4, dated May 16, 2023, 9 pages.

* cited by examiner

AUTONOMOUS AERIAL IMAGING AND ENVIRONMENTAL SENSING OF A DATACENTER

BACKGROUND

A datacenter is a building or area of a building that houses computer services and infrastructure, e.g., computer systems, storage systems, and cooling systems. The interior of a datacenter is complex, varied and dynamic because of the large number of components included in the datacenter and processes associated with these components, e.g., construction, maintenance, configuration, and repairs. Workload, consumption, and temperature fluctuate widely, e.g., from hour to hour. Monitoring and reporting the operating state of a data center, particularly in real-time or near-real time, is therefore a challenging task.

SUMMARY

This specification describes systems and methods for autonomous aerial imaging and environmental sensing, e.g., humidity, temperature, noise, Wi-Fi spectrum, airflow, of a datacenter.

In general, one innovative aspect of the subject matter described in this specification may be embodied in methods that include the actions of executing, within a datacenter and by an unmanned aerial vehicle (UAV) in data communication with a server, a connectivity-enabled navigation process to collect data from the datacenter; determining, during execution of the connectivity-enabled navigation process and by the UAV, that connection to the server is lost so that the connectivity-enabled navigation process cannot be continued; and in response to determining that connection to the server is lost, executing, by the UAV, an autonomous navigation process until the connection to the server is recovered, wherein the autonomous navigation process navigates the datacenter using visual tags positioned in the datacenter.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations executing the autonomous navigation process comprises: activating an onboard imaging system; and searching, using the onboard imaging system, for a visual tag positioned in the datacenter; and in response to successfully identifying, by the onboard imaging system, a visual tag, flying, by the UAV towards the visual tag.

In some implementations the method further comprises, in response to unsuccessfully identifying a visual tag, widening the search for the visual tag or returning to a docking station.

In some implementations the method further comprises, in response to successfully identifying, by the onboard imaging system, a visual tag, extracting metadata from the visual tag to determine properties of the visual tag, the properties comprising a location of the visual tag; determining, by the UAV and using the properties of the visual tag, whether to fly to the visual tag or not; and in response to determining to fly to the visual tag, flying to the visual tag; or in response to determining not to fly to the visual tag, searching for another visual tag.

In some implementations determining, by the UAV and using the properties of the visual tag, whether to fly to the visual tag or not comprises one or more of: determining whether the location of the visual tag is within a predetermined set of distance offsets from a known location from which to collect data or not and in response to determining that the location of the visual tag corresponds to a location from which to collect data, flying to the visual tag; determining whether data has already been collected from the location of the visual tag during a current data collection mission or not and in response to determining that data has not already been collected from the location of the visual tag, flying to the visual tag; or determining whether a name of the visual tag indicates that the location of the visual tag is relevant to the current data collection mission or not and in response to determining that the name of the visual tag indicates that the location of the visual tag is relevant to the current data collection mission, flying to the visual tag.

In some implementations the method further comprises one or more of collecting data from a position that is within a predetermined set of distance offsets from the visual tag or collecting data whilst flying towards the visual tag.

In some implementations the method further comprises, after collecting data from a position that is within a predetermined set of distance offsets from the visual tag or collecting data whilst flying towards the visual tag, searching for another visual tag positioned in the datacenter.

In some implementations the method further comprises determining, by the UAV and using the properties of the visual tag, whether to collect a sensor package for collecting sensor data from a position that is within a predetermined set of distance offsets from the visual tag; in response to determining to collect a sensor package, collecting the sensor package and using the sensor package to collect sensor data from a position that is within a predetermined set of distance offsets from the visual tag; and returning the sensor package.

In some implementations searching for a visual tag positioned in the datacenter comprises querying an onboard processing system for a visual tag that is likely to be close to a current location of the UAV and flying towards the visual tag.

In some implementations the onboard imaging system is separate from an onboard imaging system used to collect image data from the datacenter.

In some implementations the visual tags comprise geo-tagged visual media and metadata represented by the visual tags comprises one or more of a physical tag location, a logical tag location, tag altitude, or tag name.

In some implementations the visual tags are positioned independent of pre-defined data collection mission or path and the visual tags are positioned on one or more of: a floor of the datacenter, walls of the datacenter, on racks at ends of datacenter rows, a ceiling of the datacenter, or a top surface of racks included in the datacenter.

In some implementations the UAV collects image data using an onboard imaging system and environmental data using one or more sensors, the environmental data comprising a measured temperature, humidity, noise, Wi-Fi spectrum, or wind speed.

In some implementations the method further comprises determining, during execution of the autonomous navigation process and by the UAV, that the connection to the server has returned so that the connectivity-enabled navigation process can be continued; and in response to determining that the connection to the server has returned, executing, by the UAV, the connectivity-enabled navigation process.

In some implementations executing, by the UAV, the connectivity-enabled navigation process comprises performing a reconciliation of the connectivity-enabled navigation process, the performing comprising: determining a location at which the connection to the server was lost and a location at which the connection to the server returned; determining whether waypoints or data collection steps were missed during the autonomous navigation process between the location at which the connection to the server was lost and the location at which the connection to the server returned; and in response to determining that waypoints or data collection steps were missed, adjusting the connectivity-enabled navigation process to include the missed waypoints or data collection steps.

In some implementations executing, by the UAV, the connectivity-enabled navigation process comprises performing a reconciliation of the connectivity-enabled navigation process, the performing comprising: determining a location at which the connection to the server was lost and a location at which the connection to the server returned; determining whether additional waypoints or data collection steps were performed during the autonomous navigation process; and in response to determining that additional waypoints or data collection steps were performed during the autonomous navigation process, adjusting the connectivity-enabled navigation process to remove the additional waypoints or data collection steps.

In some implementations the method further comprises storing, by the UAV, data collected during the autonomous navigation process; and uploading, by the UAV, the stored data to the server when the connection to the server is recovered.

In some implementations the autonomous navigation process further navigates the datacenter using path finding performed by an artificial intelligence layer included in the UAV.

Some implementations of the subject matter described herein may realize, in certain instances, one or more of the following advantages.

A system implementing the presently described autonomous datacenter aerial imaging and sensing techniques can monitor and collect data from a datacenter without requiring GPS signals or a constant connection to a navigation controller or server. In addition, the presently described autonomous datacenter aerial imaging and sensing techniques can be combined with a connectivity-based navigation process and executed as part of a recovery operation in the event that a connection to a navigation controller/server goes down. Compared to conventional recovery operations, e.g., hovering in place until connectivity is recovered, landing in place until connectivity is recovered, returning to a docking station, or backtracking a recent flightpath until connectivity is recovered or until it reaches its previous docking station, the presently described recovery operation are more efficient and less resource intensive.

In addition, a system implementing the presently described autonomous datacenter aerial imaging and sensing techniques can collect a richer stream of data, e.g., compared to conventional systems that do not use drones, since drones can be used to navigate to areas that a person or other vehicle might not otherwise be able to access. In addition, data collection can be completed much faster, e.g., compared to conventional systems that do not use drones. Since datacenters can be very large, this speed up can be particularly beneficial.

In addition, a system implementing the presently described autonomous datacenter aerial imaging and sensing techniques can perform imaging or environmental sensing at different heights, e.g. measuring temperature or Wi-Fi signal strength at multiple heights. This can be particularly beneficial since data centers can include hard to reach areas or infrastructure that is deployed high up, which would be difficult to image from floor levels. As an example, the angle of read from floor levels make some device barcodes impossible to read. Conventional solutions (different from the presently described techniques) to this problem require that the camera is placed on a mast that can be raised or lowered. However, this further slows down data acquisition and increases device costs.

In addition, a system implementing the presently described autonomous datacenter aerial imaging and sensing techniques uses aerial highways that do not interfere with existing personnel and material paths. Accordingly, the speed of reaching a target location is improved.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
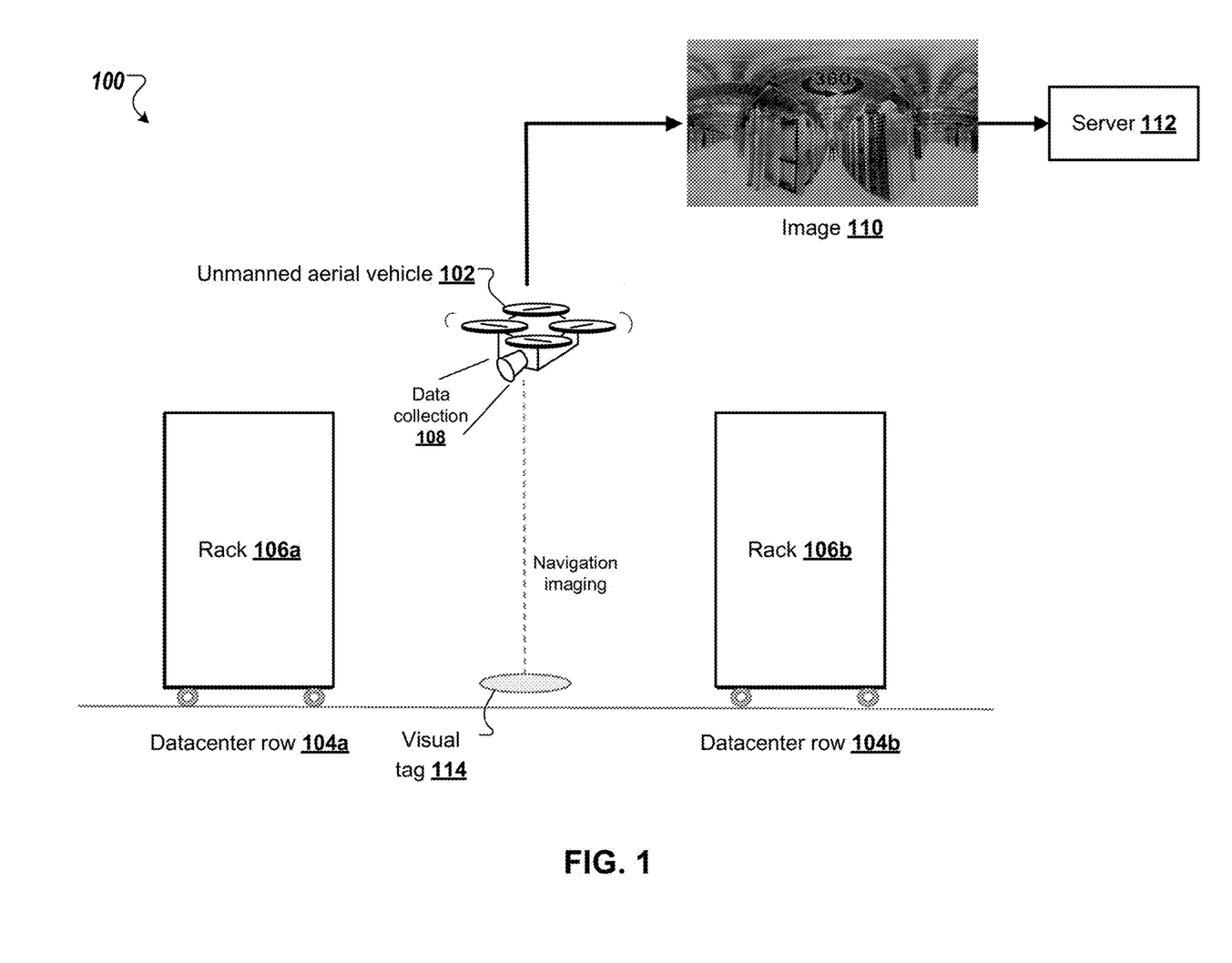
FIG. 1 shows an example of an environment for autonomous datacenter aerial imaging and sensing.

This specification describes systems and methods for imaging and sensing a datacenter using an unmanned aerial vehicle (UAV) that performs an autonomous navigation process. Under the autonomous navigation process, the UAV navigates the datacenter using visual tags positioned in the datacenter and does not require connectivity to an operator or navigation system. Therefore, imaging and sensing of an area can be performed without connectivity and collected data can be reported when the UAV returns to an area with connectivity. FIG. 1 shows an example of an environment 100 for autonomous datacenter aerial imaging and sensing. An unmanned aerial vehicle (UAV) 102, e.g., a drone, navigates a datacenter to collect data from predetermined target locations within the datacenter. The datacenter can include multiple datacenter rows, e.g., datacenter rows 104a and 104b, where each datacenter row includes multiple racks, e.g., racks 106a and 106b, that each house servers and other computing components such as networking devices or telecommunication devices. The datacenter can also include power equipment, water treatment facilities, and cooling systems that keep the servers operating smoothly.

The UAV 102 can include an imaging system and other sensors, e.g., thermal, humidity, noise, airflow, or Wi-Fi spectrum sensors, that collect data 108 from within the data center as part of an imaging and sensing mission. Example missions include new datacenter discovery, detailed scans or checks of a particular area of the datacenter or a particular rack/device in the datacenter, or datacenter audits. The collected data 108 can include image data or environmental data, e.g., data representing a measured humidity, temperature, noise level, airflow speed, or Wi-Fi spectrum. For example, the UAV 102 can include a first onboard imaging system that collects images of target locations within the data center, e.g., image 110, of specific rows, racks, or servers. The UAV 102 can also include an onboard processor that stores the collected images in a data store and uploads the collected images to an external server 112 for analysis, e.g., in real time using wireless communication or when the UAV 102 docks at a docking station.

The UAV 102 can also include a second onboard imaging system that is used to navigate the datacenter. The second onboard imaging system can be separate to the first onboard imaging system used to collect image data. For example, the UAV 102 can use the second onboard imaging system to search the datacenter for visual tags, e.g., visual tag 114, positioned in the datacenter. The visual tags can include geotagged visual media, e.g., geotagged photographs, images or QR codes. Metadata represented by the visual tags can include, e.g., a physical tag location, logical tag location, tag altitude, and tag name. In some implementations visual tags in a particular area can be commonly named, e.g., visual tags near datacenter rows can be named differently to visual tags near a water treatment facility.

The position of the visual tags in the datacenter can vary. As shown in example environment 100, in some implementations the visual tags can be placed on the floor. In these implementations the visual tags could also be used by personnel or other imaging systems such as a vehicular imaging systems that operate in the datacenter. In other implementations the visual tags can be placed on walls in the datacenter, e.g., at the end of a row of racks, on the ceiling of the datacenter, or on the top of one or more racks, e.g., a top surface of a rack. This can be beneficial since such visual tags would not need regular maintenance and would be less likely to be covered by other objects in the datacenter (compared to, e.g., visual tags positioned on the floor which could easily get scratched or covered). In some implementations the visual tags can be placed at an optimal flying altitude, e.g., an altitude with a least amount of obstacles for the UAV to navigate. In some implementations the exact positioning of the visual tags can depend on the capabilities of the second onboard imaging system, e.g., the visual tags can be spaced far apart if the onboard imaging system has a high resolution. Generally, the visual tags need not be positioned on a pre-programmed path. The positioning can be independent of data collection missions.

Each visual tag can be associated with a physical or logical location in the datacenter. The UAV 102 can use these locations to identify its current location and navigate through the datacenter. For example, when the UAV 102 identifies a visual tag using the second onboard imaging system, the UAV 102 can determine whether to navigate towards the visual tag or not, e.g., whether the visual tag is a target location from which to collect data. If the visual tag is a target location from which to collect data, the UAV 102 can fly to the visual tag and collect the required data. If the visual tag is not a target location from which to collect data, the UAV 102 can use the second onboard imaging system to search for another, different visual tag. In this manner, the UAV 102 can hopscotch from one visual tag to another and collect all necessary data.

Figure 2:
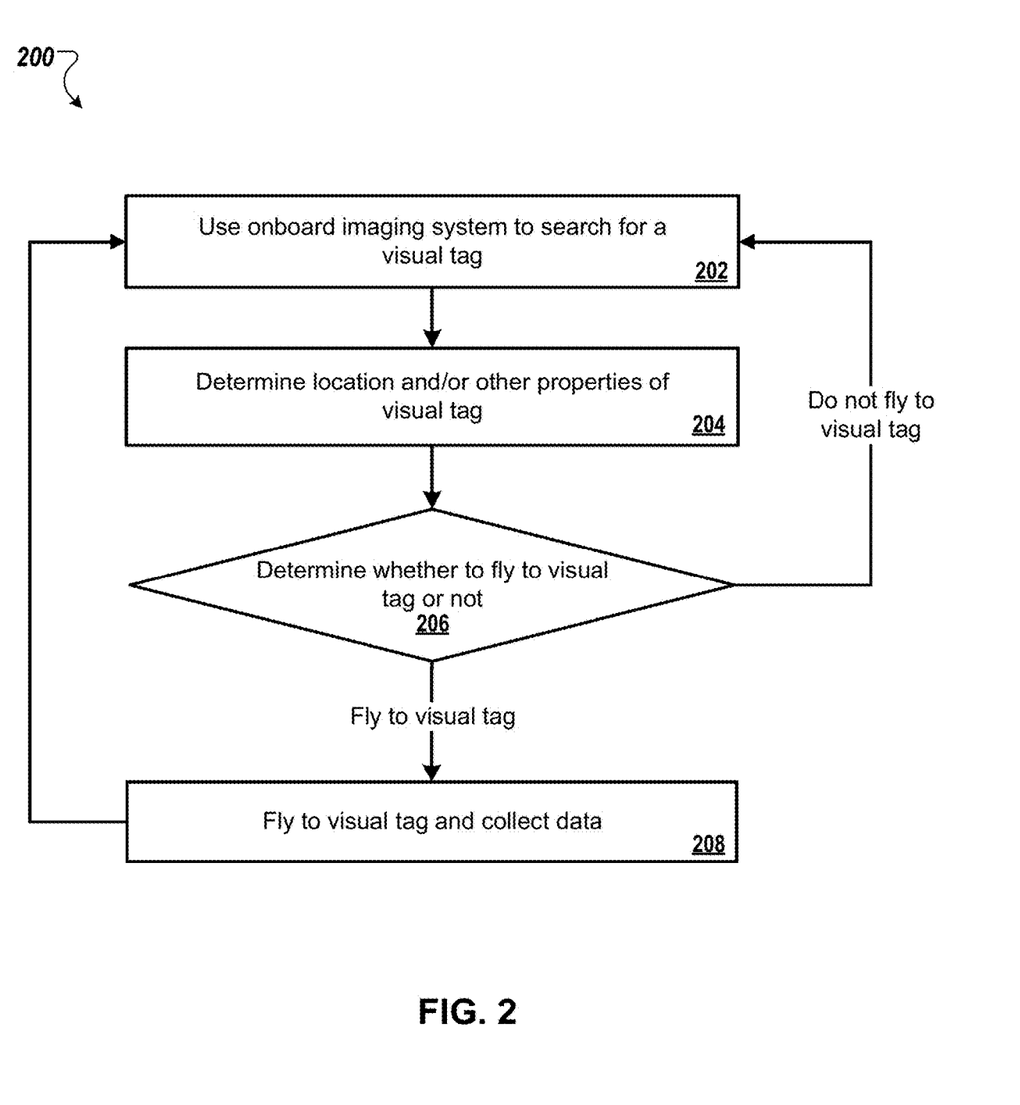
FIG. 2 is a flowchart of an example process for collecting data from a datacenter using an autonomous navigation process.

FIG. 2 is a flowchart of an example process 200 for collecting data from a datacenter using an autonomous navigation process. For convenience, the process 200 will be described as being performed by an UAV included in an autonomous datacenter aerial imaging and sensing system. For example, the unmanned aerial vehicle (UAV) 502 of FIG. 5, appropriately programmed, can perform example process 200.

The UAV uses its onboard imaging system to search for a visual tag (step 202). In some implementations the UAV can use its most recent known location to query an onboard processing system for visual tags that are likely to be close to its current location. The UAV can then fly at a low, safe speed in a direction towards one of the close visual tags. If the UAV cannot find any visual tags, e.g., visual tags that should be close to its current location, the UAV can widen the search for visual tags or return to its docking station.

In some implementations the UAV can also use an artificial intelligence layer to search for visual tags. The artificial intelligence layer can be trained to process image data collected by the onboard imaging system and identify objects in the image data that are likely to include or be near a visual tag.

For example, as described above, in some implementations visual tags can be positioned on the top of datacenter racks. In this example, the UAV can include an artificial intelligence layer that is trained to identify datacenter racks in an image or video of the datacenter. Then, during the search for a visual tag the UAV can activate the onboard imaging system to collect image data of its current surroundings and process the image data using the trained artificial intelligence layer. If the artificial intelligence layer detects an object, e.g., a datacenter rack, in the image data the UAV can fly towards the detected object to search for a visual tag. For example, if the UAV is currently located in an aisle between two rows of racks, the artificial intelligence layer can determine that there is a datacenter rack directly in front of the UAV. In response, the UAV can increase its altitude so that the top of the datacenter rack and neighboring datacenter racks are visible, and search for a visual tag.

As another example, as described above, in some implementations visual tags can be positioned on the datacenter ceiling. In this example, the UAV can include an artificial intelligence layer that is trained to identify the ceiling or datacenter racks in an image or video of the datacenter. Then, during the search for a visual tag the UAV can activate the onboard imaging system to collect image data of its current surroundings and process the image data using the trained artificial intelligence layer. If the artificial intelligence layer detects an object, e.g., ceiling or datacenter rack, in the image data the UAV can fly towards the detected object or change its field of view to search for a visual tag.

For example, if the UAV is currently located in an aisle between two rows of racks, the artificial intelligence layer can determine that there is a datacenter rack directly in front of the UAV. In response, the UAV can determine to adjust its field of view to look upwards at the ceiling and search for a visual tag.

When the UAV identifies a visual tag, the UAV can extract metadata from the visual tag to determine a location and/or other properties of the visual tag (step 204). The UAV then uses the determined location and/or other properties of the visual tag to determine whether to fly to the visual tag or not (step 206). For example, the UAV can determine to fly to a visual tag if the UAV has not recently collected data from the location of the visual tag. Similarly, the UAV can determine not to fly to a visual tag if the UAV has recently, e.g., during the current data collection mission, collected data from the location of the visual tag. As another example, the UAV can determine to fly to a visual tag if the name of the visual tag indicates that the location is relevant to the current data collection mission, e.g., visual tags with names that indicate that the visual tags are located near datacenter rows can be relevant to a datacenter discovery mission whereas visual tags with names that indicate that the visual tags are located near a water treatment facility can be relevant to a mission for checking the operation of the water treatment facility. Similarly, the UAV can determine not to fly to a visual tag if the name of the visual tag indicates that the location is not relevant to the current mission.

In response to determining not to fly to the visual tag at step 206, the example process 200 returns to step 204 and the UAV uses the onboard imaging system to search for another visual tag.

In response to determining to fly to the visual tag at step 206, the UAV flies towards the visual tag and collects data (step 208). In some implementations the UAV can collect data from a position that is close to, e.g., within a predetermined set of offsets from, the visual tag. For example, if the visual tag is positioned on the ceiling of the datacenter at the end of an aisle that is between two datacenter rows, the UAV can fly to a predetermined distance/offset below the visual tag on the ceiling and collect images (or other sensor data) of the datacenter from this position. This could produce images similar to image 110 of FIG. 1. In other implementations the UAV can collect data whilst flying from one visual tag to another. For example, if visual the visual tag is positioned on a wall at the end of an aisle that is between two datacenter rows, the UAV can fly along the aisle and collect images (or other sensor data) of the racks in the datacenter rows as it flies along the aisle.

The collected data can include image data and other environmental data. In some implementations image data can be collected using another onboard imaging system that is different to the onboard imaging system used to identify the visual tags. Environmental data can be collected using respective sensors. For example, the UAV can include an anemometer for measuring wind speed, e.g., an amount of wind blowing on racks in the datacenter in order to determine that cooling fans are functioning properly and are not broken or blocked. As another example, the UAV can include a hygrometer for measuring humidity, e.g., in order to determine that a water cooling system is functioning properly and is not leaking. As another example, the UAV can include a thermal sensor to measure temperatures in the datacenter. As another example, the UAV can include a Wi-Fi spectrum analyzer that measures Wi-Fi signals in the datacenter. As another example, the UAV can include a decibel meter or other sensor for measuring noise or sound levels in the datacenter. As another example, the UAV can include an anemometer that measures air flow or wind speed in the datacenter.

In some implementations the UAV can be configured to collect and drop off sensor packages to collect environmental data during the navigation process, e.g., to reduce its weight during the data collection mission. For example, if a visual tag location or name indicates that it is close to a water treatment facility, the UAV can determine to collect a hygrometer to measure air humidity at or near the visual tag. After measuring the air humidity, the UAV can return the hygrometer sensor package. As another example, if a visual tag location or name indicates that it is close to or on a rack, the UAV can determine to collect a thermal sensor to measure a temperature at or near the visual tag. After measuring temperature, the UAV can return the thermal sensor package.

In some implementations, e.g., when wireless connectivity is temporarily unavailable or disabled, the collected data can be stored locally before being uploaded to a server. In other implementations, e.g., when wireless connectivity is available, the collected data can be transmitted to the server in real time. The server can analyze the collected data to monitor the datacenter and predict or prevent failures of components of the datacenter.

Once the UAV has collected the data at step 208, example process 200 returns to step 204 and the UAV uses the onboard imaging system to search for another visual tag.

In some implementations the UAV can perform the autonomous navigation process in combination with a connectivity-based navigation process to image and sense the datacenter. During a connectivity-based navigation process the UAV can be configured to follow a path in the datacenter and collect data continuously or at certain points along the path. For example, a path through the datacenter can be specified in advance and the UAV can follow the path to complete a data collection mission. The path can be defined in terms of a sequence of waypoints that are selected from a map of the datacenter, where the UAV altitude, speed, and actions (e.g., type of data collection) at or in-between waypoints can be set in advance. The UAV can be configured to follow the path using global positioning system (GPS) and optionally an inertial measurement unit (IMU).

Feedback from the GPS and IMU can enable the UAV to move along the path with minimal error. However, there are several disadvantages of relying on GPS. GPS signals are remote signals and susceptible to disruptions or interference, especially in indoor environments or areas surrounded by high buildings. When a GPS signal is weak or not available the UAV can drift from the path or be unable to complete the mission. In addition, information in a GPS signal can be modified by attackers, which could cause the UAV to follow an incorrect path.

As another example, in some implementations the path can be specified in real time, e.g., via a remote controller operated by a human pilot or a virtual pilot that is programmed to send commands using remote control in real-time as a human pilot would. In these implementations the UAV requires a constant wireless connection to the remote controller and a GPS connectivity.

However, the UAV could lose connection to the remote controller for several reasons—the remote controller could shut down due to a hardware or software issue, the distance between the UAV and remote controller could exceed a connectivity threshold, magnetic interference from the surrounding area could interfere with the connection, or new updates or firmware can disrupt the connection.

In conventional systems, if an UAV loses connectivity during a connectivity-based navigation process, the UAV can perform recovery operations such as: hover in place until connectivity is recovered, land in place until connectivity is recovered, return to its docking station, or backtrack its recent flightpath until connectivity is recovered or until it reaches its previous docking station. Typically, once the drone returns to the docking station or otherwise aborts the mission, it is not possible to restart the mission at the point at which the mission was previously disconnected—the mission must be repeated from the start. These recovery operations can therefore be very inefficient and resource intensive, particularly when considering the typical size of datacenters.

The autonomous datacenter aerial imaging and sensing system described in this specification can implement an improved recovery operation in the case of a loss of connectivity and/or becoming lost, as described below with reference to FIGS. 3A-D and 4.

Figure 3A:
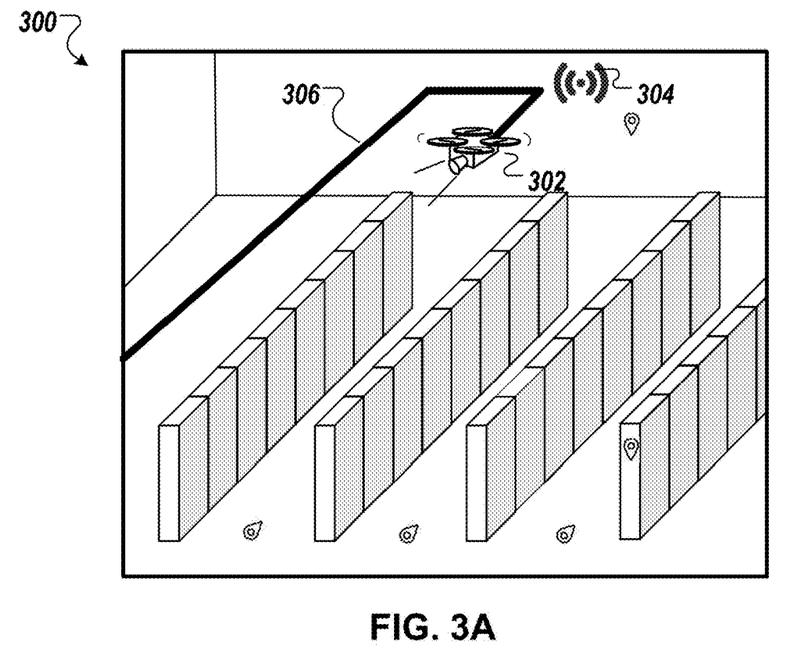
FIGS. 3A-D show examples of environments in which an autonomous datacenter aerial imaging and sensing system executes a connectivity-enabled navigation process and an autonomous navigation process.

FIGS. 3A-D show examples of environments in which an autonomous datacenter aerial imaging and sensing system executes a connectivity-enabled navigation process and an autonomous navigation process. As used in this specification, a "connectivity-enabled navigation process" is a navigation process by which a UAV navigates using network data received over network link, such as a GPS link, a Wi-Fi link, or some other network link. As shown in FIG. 3A, a UAV 302 in the environment 300 executes a connectivity-based navigation process to collect data from a datacenter. For example, the UAV 302 can use an available wireless communication 304 to communicate with a server and execute a waypoint flight mode. Under the waypoint flight mode, the UAV 302 can follow a preprogrammed flight path 306 and collect data from the data center along the way.

However, as described above, the UAV 302 can lose connection to the server and/or stop receiving GPS signals for a variety of reasons. For example, in the environment 308 shown in FIG. 3B the wireless communication 310 is down. The UAV 302 can therefore no longer continue the connectivity-enabled navigation process and cannot follow the remainder of the preprogrammed flight path 306. Instead of hovering, landing, or backtracking the flight path 306, the UAV 302 switches to an autonomous flight mode and executes an autonomous navigation process until the wireless communication 310 returns (or until the data collection mission is complete). As used in this specification, an "autonomous navigation process" is a navigation process by which a UAV navigates using visual data received by use of an on-board imaging sensor and without the use of data received over network link, such as a GPS link, a Wi-Fi link, or some other network link.

Figure 3B:
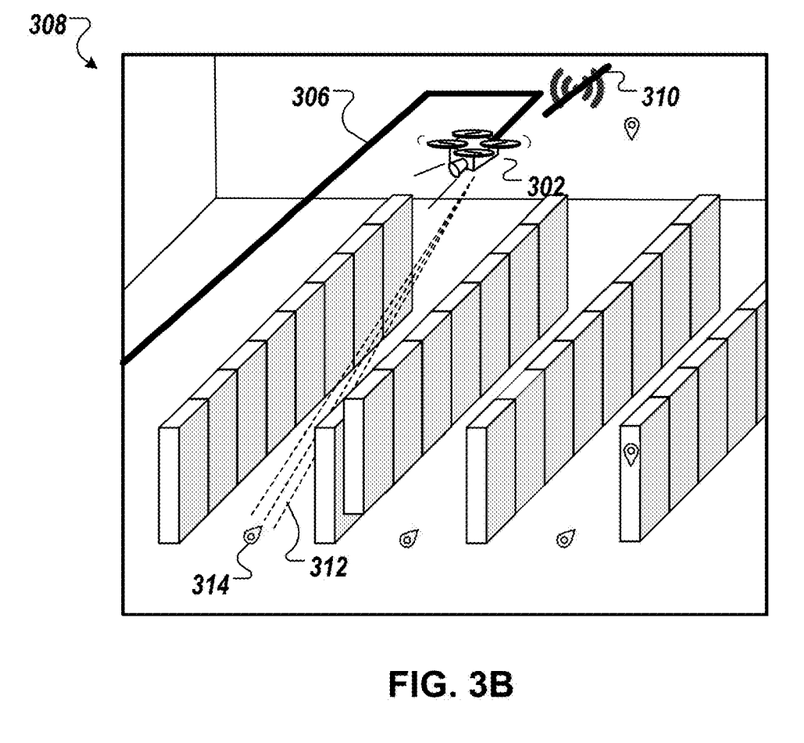
Figure 3C:
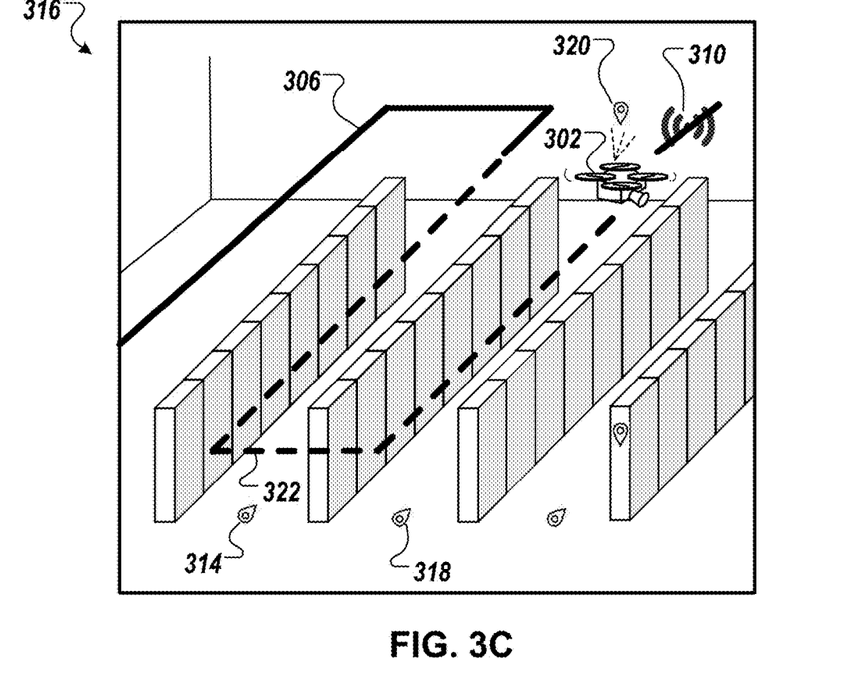

For example, the UAV 302 can lower its current speed and activate an onboard imaging system. The UAV 302 can hover or creep forward at a safe, low speed and, using the onboard imaging system, search 312 for visual tags that have been positioned throughout the datacenter, as described above with reference to FIGS. 1 and 2. In example environment 308 the UAV 302 uses the onboard imaging system to find and identify visual tag 314 which has been positioned on the floor in the datacenter.

As described above with reference to FIGS. 1 and 2, the visual tags can be associated with respective logical locations in the datacenter. The UAV 302 can use these logical locations to identify its current location and navigate through the datacenter, flying from one visual tag to another. As shown in environment 316 of FIG. 3C, after losing connectivity the UAV 302 has executed an autonomous navigation process and, through sequential identification of visual tags, e.g., visual tags 314, 318, and 320, has followed path 322 through the datacenter, collecting data along the way.

Figure 3D:
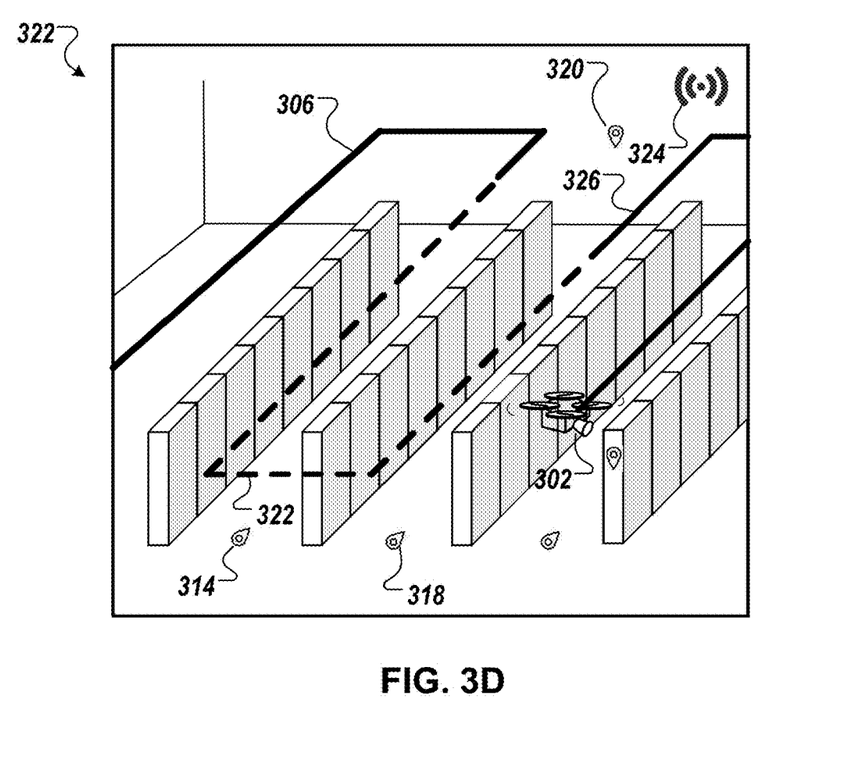

As shown in environment 322 of FIG. 3D, when the wireless connection 324 returns the UAV 302 can continue the connectivity-enabled navigation process and follow the remainder of the preprogrammed flight path, e.g., path 326. In some implementations the UAV 302 can also perform a reconciliation of the data collection mission. For example, the UAV 302 can determine a location at which the connection to the server was lost and a location at which the connection to the server returned. The UAV 302 can then determine whether waypoints or data collection steps were missed during the autonomous navigation process between these locations and adjust the preprogrammed flight path included in the connectivity-based navigation process to include these waypoints or data collection steps. As another example, the UAV 302 can determine whether additional waypoints and data collection was performed during the autonomous navigation process and adjust the preprogrammed flight path included in the connectivity-based navigation process to remove these waypoints or data collection steps and to avoid repeating a section of the flight path and collecting redundant data.

Figure 4:
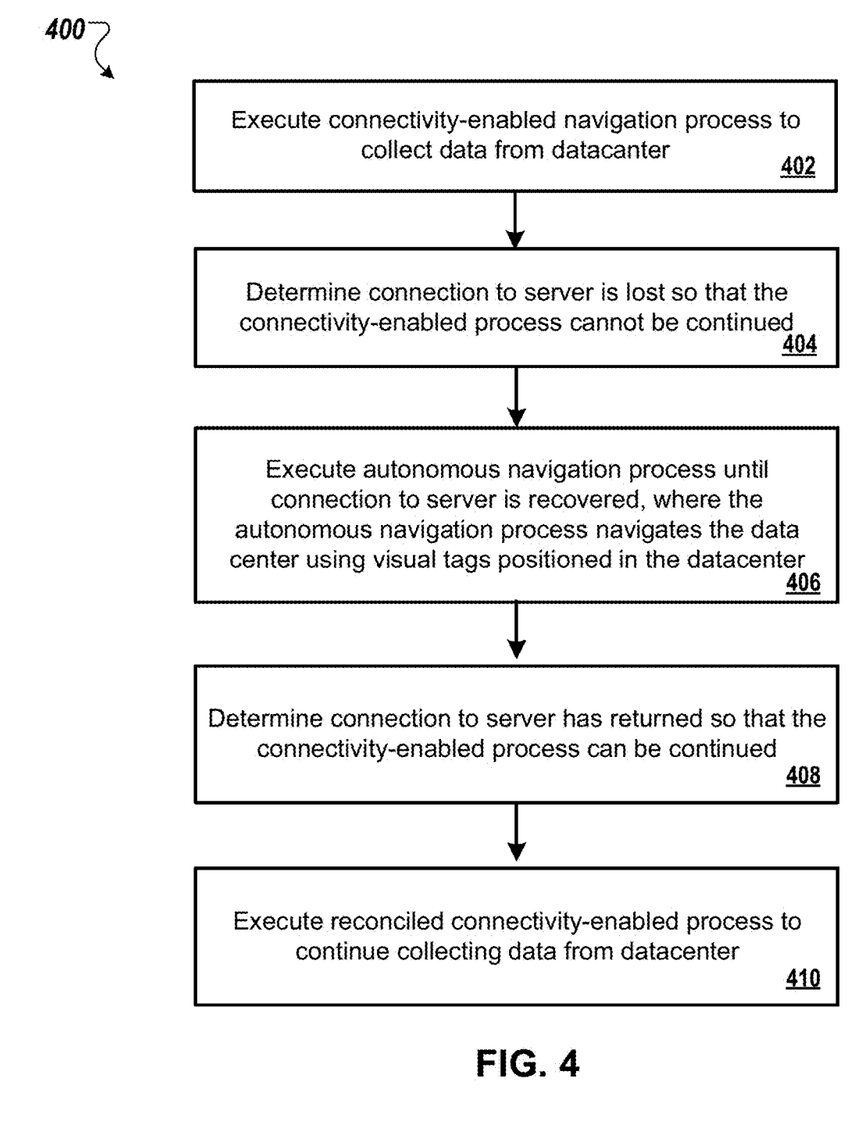
FIG. 4 is a flow chart of an example process for collecting data from a datacenter using a connectivity-enabled navigation process and an autonomous navigation process.

FIG. 4 is a flowchart of an example process 400 for collecting data from a datacenter using a connectivity-based navigation process and an autonomous navigation process. For convenience, the process 400 will be described as being performed by a UAV that is included in an autonomous datacenter aerial imaging and sensing system. For example, the UAV 502 of FIG. 5, appropriately programmed, can perform example process 400.

The UAV executes a connectivity-enabled navigation process within a data center to collect data from the data center (step 402). During the connectivity-enabled navigation process the UAV is in data communication with a server or controller. Example connectivity-enabled navigation processes are described above with reference to FIGS. 1-3.

During execution of the connectivity-enabled navigation process, the UAV determines that connection to the server is lost so that the connectivity-enabled navigation process cannot be continued (step 404). In response to determining that connection to the server is lost, the UAV executes an autonomous navigation process, e.g., as described above with reference to FIGS. 1 and 2, until the connection to the server is recovered (step 406).

Under the autonomous navigation process, the UAV navigates the data center using visual tags positioned in the data center. As described above with reference to FIGS. 1-3, to execute the autonomous navigation process the UAV can activate an onboard imaging system and use the onboard imaging system to search for a visual tag positioned in the datacenter. As described above with reference to FIGS. 1-2, the visual tags can include geotagged visual media with associated metadata that can include data representing a physical tag location, a logical tag location, tag altitude, or tag name. The visual tags can be positioned independent of pre-defined data collection mission or path, e.g., on the floor of the datacenter, walls of the datacenter, racks at ends of datacenter rows, a ceiling of the datacenter, or a top surface of racks included in the datacenter. Searching a datacenter for a visual tag is described above with reference to FIGS. 1 and 2.

In response to a successful identifying a visual tag, the UAV can extract metadata from the visual tag to determine properties of the visual tag, e.g., a location or name of the visual tag, and use the properties to determine whether to fly to the visual tag or not.

For example, the UAV can determine whether the location of the visual tag is close to, e.g., within a predetermined distance/offset from, a known location from which to collect data or not and in response to determining that the location of the visual tag corresponds to a location from which to collect data, fly to the visual tag. As another example, the UAV can determine whether data has already been collected from the location of the visual tag during a current data collection mission or not and in response to determining that data has not already been collected from the location of the visual tag, fly to the visual tag. As another example the UAV can determine whether a name of the visual tag indicates that the location of the visual tag is relevant to the current data collection mission or not and in response to determining that the name of the visual tag indicates that the location of the visual tag is relevant to the current data collection mission, fly to the visual tag.

When the UAV determines to fly to a visual tag, it can collect data from a position that is within a predetermined set of distance offsets from the visual tag or collect data whilst flying towards the visual tag. As described above with reference to FIGS. 1 and 2, in some implementations the UAV can also use properties of a visual tag to determine whether to collect a sensor package for collecting sensor data from a position that is within a predetermined set of distance offsets from the visual tag. In response to determining to collect a sensor package, the UAV can collect the sensor package and use the sensor package to collect sensor data from a position that is within a predetermined set of distance offsets from the visual tag. After the sensor data has been collected, the UAV can return the sensor package. Example sensors and sensor data are described above with reference to FIGS. 1 and 2.

The UAV can locally store image data or sensor data collected during the autonomous navigation process and upload the stored data to the server when the connection to the server is recovered or when the UAV completes the data collection mission and returns to its docking station.

In some implementations, during execution of the autonomous navigation process, the UAV can determine that the connection to the server has returned so that the connectivity-enabled navigation process can be continued (step 408). In response, the UAV can continue execution of the connectivity-enabled navigation process (step 410). In some implementations the UAV can perform a reconciliation of the connectivity-enabled navigation process before executing the connectivity-enabled navigation process.

For example, in response to determining that the connection to the server has returned, the UAV can determine a location at which the connection to the server was lost and a location at which the connection to the server returned. The UAV can then determine whether waypoints or data collection steps were missed during the autonomous navigation process between the location at which the connection to the server was lost and the location at which the connection to the server returned. In response to determining that waypoints or data collection steps were missed, the UAV can adjust the connectivity-enabled navigation process to include the missed waypoints or data collection steps.

As another example, in response to determining that the connection to the server has returned, the UAV can determine a location at which the connection to the server was lost and a location at which the connection to the server returned. The UAV can then determine whether additional waypoints or data collection steps were performed during the autonomous navigation process. In response to determining that additional waypoints or data collection steps were performed during the autonomous navigation process, the UAV can adjust the connectivity-enabled navigation process to remove the additional waypoints or data collection steps.

Figure 5:
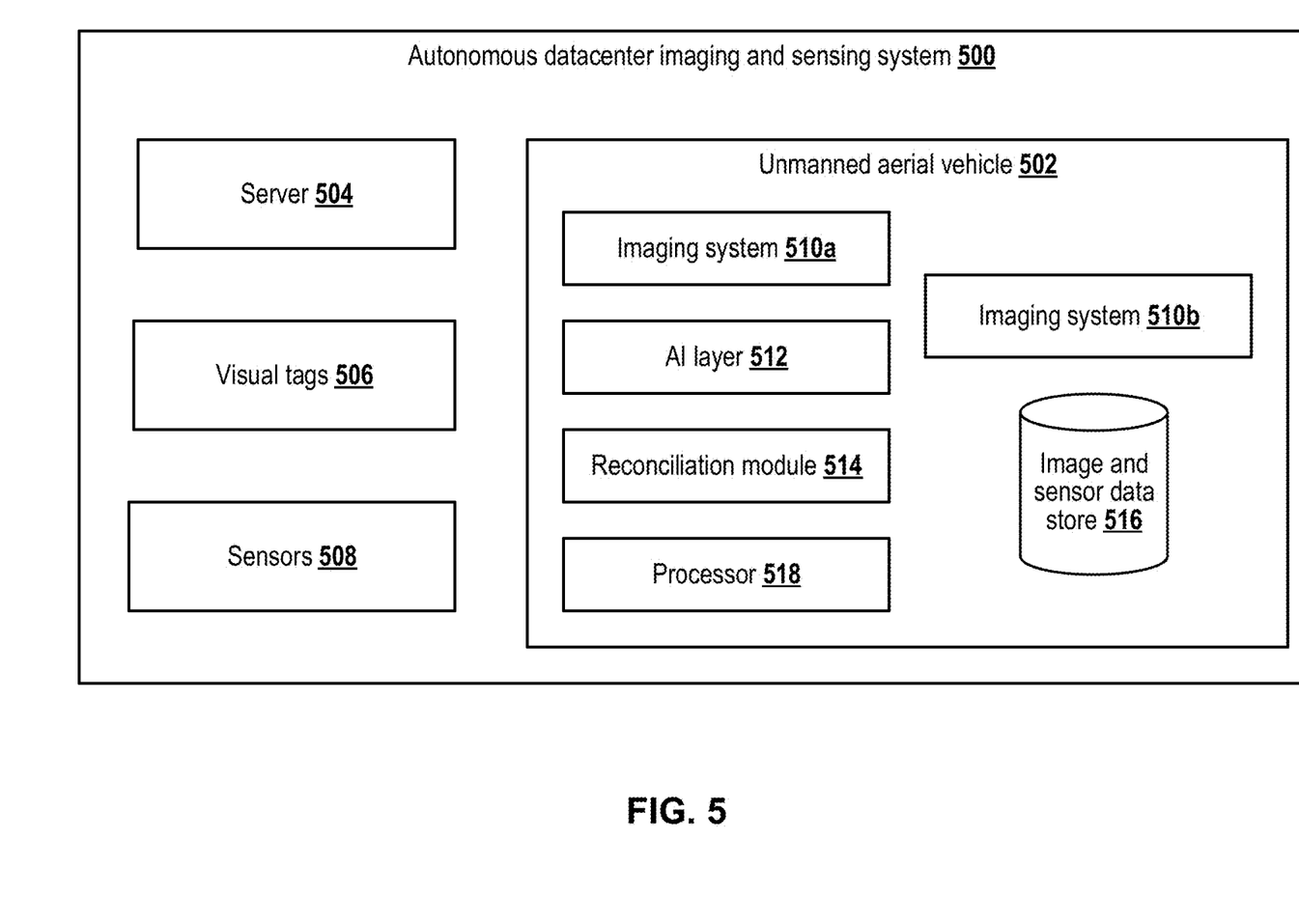
FIG. 5 is a block diagram of an example autonomous datacenter aerial imaging and sensing system.

FIG. 5 is a block diagram of an example autonomous datacenter aerial imaging and sensing system 500. The example system 500 includes an unmanned aerial vehicle (UAV) 502, a server 504, visual tags 506, and optionally one or more sensors 508. In this example system the sensors 508 are separate to the UAV 502, however in some implementations the sensors 508 can be included in the UAV 502.

The UAV 502 can be, e.g., an industrial drone that is configured to perform a connectivity-enabled navigation process and/or the autonomous navigation process described in this specification. For example, when a connection to the server 504 is available the UAV 502 can be remotely piloted or programmed to follow a pre-defined flight path. However, when a connection to the server 504 is not available the UAV 502 can perform an autonomous navigation process as described above with reference to FIGS. 1-4.

The UAV 502 can include imaging equipment and sensors for collecting data from a datacenter. For example, the UAV 502 can include a first imaging system 510*a*, e.g., electronic imaging device, that is configured to collect image data. In some implementations the UAV 502 can also include sensors 508 for collecting environmental data from the datacenter. In other implementations sensors 508 for collecting environmental data can be external to the UAV 502, as shown in example system 500. In these implementations the UAV 502 can be configured to collect, carry, and return sensors for specific data collection missions. The sensors 508 can include hygrometers for measuring humidity, thermal sensors for measuring temperatures, anemometers for measuring wind speed, or any other sensor that can collect relevant data from the datacenter.

The UAV 502 can also include an image and sensor data store 516 that is configured to store data collected by the first imaging system 510*a* and the sensors 508. For example, the UAV 502 can store collected data in the image and sensor data store 516 and transmit the stored data to the server 504 at regular time intervals, e.g., when a wireless connection to the server 504 is available.

The UAV 502 can also include a second imaging system 510*b*, e.g., electronic imaging device, for navigating the datacenter as part of the autonomous navigation process. As shown in example system 500, the second imaging system 510*b* can be separate to the first imaging system 510*a* used to collect image data from the data center. The second imaging system 510*b* can collect image data and provide the collected image data to the processor 518.

The processor 518 can be configured to identify visual tags in the image data collected by the second imaging system 510*b*. If a visual tag is identified, the processor 518 can analyze or read the visual tag and extract metadata from the visual tag to determine a location and/or other properties of the visual tag. The processor 518 can then determine whether to fly to the visual tag or not, as described above with reference to FIG. 2. In response to determining not to fly to the visual tag, the processor 518 can analyze other portions of the image data collected by the second imaging system 510*b* to search for a different visual tag or cause the aerial camera to collect additional image data. In response to determining to fly to the visual tag, the processor 518 can instruct the UAV to fly towards the visual tag and collect data.

The UAV 502 can further include an artificial intelligence layer 512 that is configured to process image data collected by the imaging system 510*a* and identify objects in the image data. For example, the artificial intelligence layer 512 can be trained to detect objects that are likely to include or be near visual tag in order to assist the UAV when searching for a visual tag, as described above with reference to FIG. 2.

The UAV 502 can further include a reconciliation module 514. The reconciliation module 514 is configured to perform reconciliations of data collection missions, e.g., after the UAV 502 has performed an autonomous navigation process. For example, the reconciliation module 514 can determine whether waypoints or data collection steps were missed during an autonomous navigation process and adjust a preprogrammed flight path included in a connectivity-based navigation process to include these waypoints or data collection steps. Example operations performed by the reconciliation module 514 are described above with reference to FIG. 3D.

The UAV 502 and the server 504 can be connected via a network, e.g., a local area network (LAN), wide area network (WLAN), the Internet, or a combination thereof, which can be accessed over a wired and/or a wireless communications link. During a connectivity-enabled navigation process, the server 504 can remotely pilot the UAV 502 or transmit instructions to follow a pre-programmed flight path. The server 504 can also receive image or sensor data collected by the UAV 502, e.g., in real time, at regular time intervals, or after a data collection mission is complete. The server 504 can analyze received image or sensor data to monitor the datacenter and predict or prevent failures of components of the datacenter.

The visual tags 506 can include geotagged visual media, e.g., geotagged photographs, images or QR codes, that are positioned in the datacenter. Metadata represented by the visual tags can include, e.g., a physical tag location, logical tag location, tag altitude, and tag name.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 6:
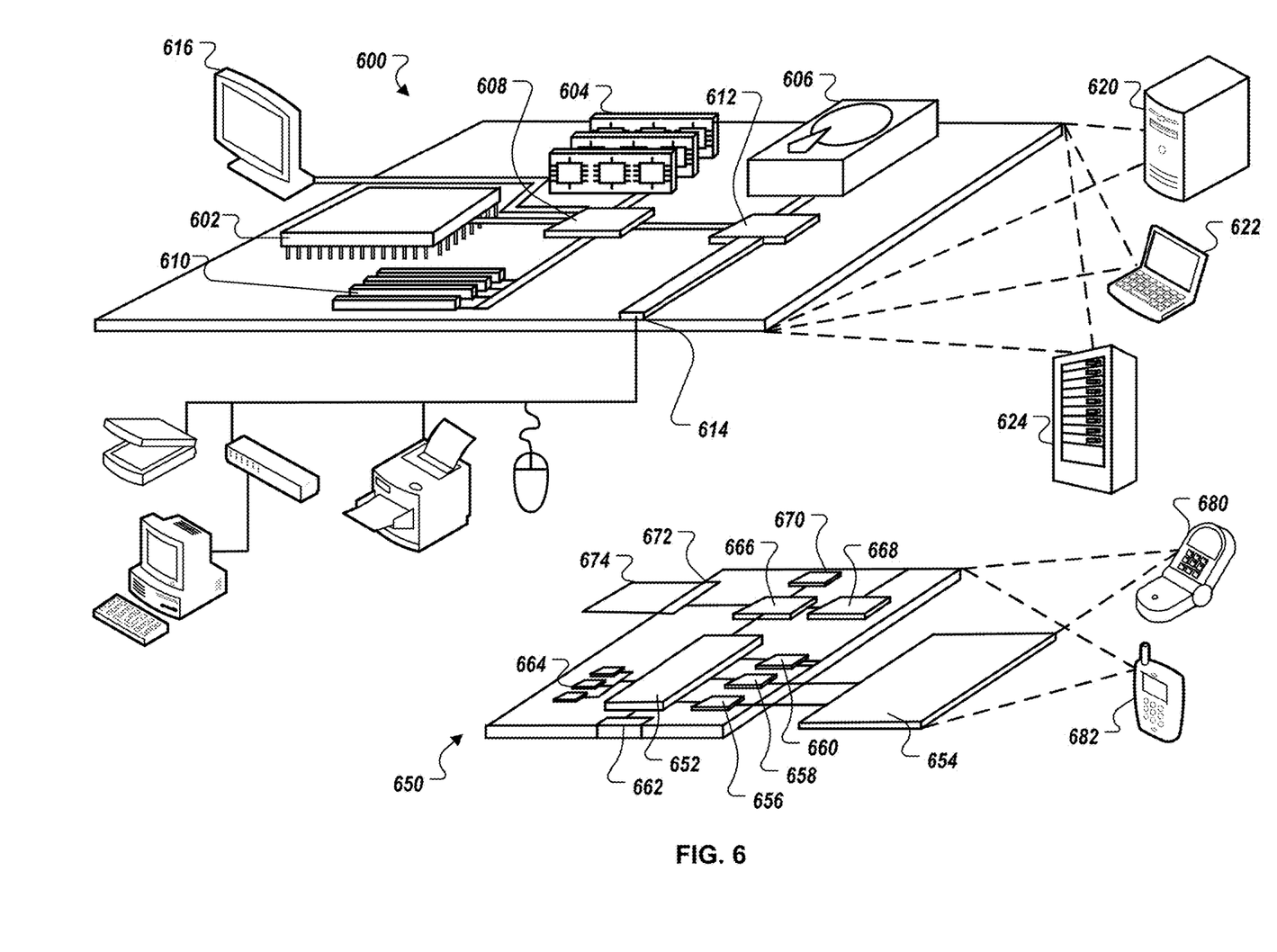
FIG. 6 is a block diagram of a computing system that can be used in connection with computer-implemented methods described in this specification.

FIG. 6 is a block diagram of computing devices 600, 650 that may be used to implement the systems and methods described in this document, as either a client or as a server or plurality of servers. Computing device 600 is intended to represent various forms of digital computers or processors, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA4000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650.

Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
executing, within a datacenter and by an unmanned aerial vehicle (UAV) in data communication with a server, a connectivity-enabled navigation process to collect data from multiple predetermined target locations in the datacenter as part of an imaging and sensing data collection mission;
determining, during execution of the connectivity-enabled navigation process and by the UAV, that connection to the server is lost so that the connectivity-enabled navigation process cannot be continued; and
in response to determining that connection to the server is lost, executing, by the UAV, an autonomous navigation process until the connection to the server is recovered or the data collection mission is complete, wherein the autonomous navigation process navigates the datacenter using visual tags positioned in the datacenter and executing the autonomous navigation process comprises:
- searching, using an onboard imaging system, for a visual tag positioned in the datacenter;
- successfully identifying, by the onboard imaging system, a visual tag;
- in response to successfully identifying, by the onboard imaging system, the visual tag, extracting metadata from the visual tag to determine properties of the visual tag, the properties specifying a location of the visual tag within the datacenter;
- determining, by the UAV and using the properties of the visual tag, that the location of the visual tag is relevant to the data collection mission and that imaging and sensing data has not been collected from a location within a predetermined distance of the visual tag during the data collection mission;
- in response to determining that the location of the visual tag is relevant to the data collection mission and that imaging and sensing data has not been collected from a location within a predetermined distance of the visual tag during the data collection mission, flying the UAV towards the visual tag; and
- collecting the imaging and sensing data whilst flying towards the visual tag.

2. The method of claim 1, further comprising:
- unsuccessfully identifying a visual tag positioned in the datacenter, and
- in response to unsuccessfully identifying a visual tag positioned in the datacenter during the search for a visual tag, widening the search for the visual tag to successfully identify the visual tag.

3. The method of claim 1, wherein determining whether the location of the visual tag is relevant to the data collection mission comprises determining whether the location of the visual tag is within a second predetermined distance from a known location from which to collect imaging and sensing data; and wherein the properties further specify a name of the visual tag and determining whether the location of the visual tag is relevant to the data collection mission further comprises determining whether the name of the visual tag indicates that the location of the visual tag is relevant to the data collection mission.

4. The method of claim 1, further comprising, after collecting imaging and sensing data from the position that is within the predetermined distance from the visual tag or collecting imaging and sensing data whilst flying towards the visual tag, searching for another visual tag positioned in the datacenter.

5. The method of claim 1, further comprising:
- determining, by the UAV and using the properties of the visual tag, to collect a sensor package for collecting the sensing data from the position that is within the predetermined distance from the visual tag;
- in response to determining to collect a sensor package, collecting the sensor package and using the sensor package to collect the sensing data from the position that is within the predetermined distance from the visual tag; and
- returning the sensor package.

6. The method of claim 1, wherein searching for a visual tag positioned in the datacenter comprises querying an onboard processing system for a visual tag that is likely to be close to a current location of the UAV and flying towards the visual tag.

7. The method of claim 1, wherein the onboard imaging system is separate from an onboard imaging system used to collect image data from the datacenter.

8. The method of claim 1, wherein the visual tags comprise geotagged visual media and metadata represented by the visual tags comprises one or more of a physical tag location, a logical tag location, tag altitude, or tag name.

9. The method of claim 1, wherein the visual tags are positioned on one or more of: a floor of the datacenter, walls of the datacenter, on racks at ends of datacenter rows, a ceiling of the datacenter, or a top surface of racks included in the datacenter.

10. The method of claim 1, wherein the UAV collects the imaging data using an onboard imaging system and environmental sensing data using one or more sensors, the environmental sensing data comprising a measured temperature, humidity, noise, Wi-Fi spectrum, or wind speed.

11. The method of claim 1, further comprising:
- determining, during execution of the autonomous navigation process and by the UAV, that the connection to the server has returned so that the connectivity-enabled navigation process can be continued; and
- in response to determining that the connection to the server has returned, executing, by the UAV, the connectivity-enabled navigation process.

12. The method of claim 11, wherein executing, by the UAV, the connectivity-enabled navigation process comprises performing a reconciliation of the connectivity-enabled navigation process, the performing comprising:
- determining a location at which the connection to the server was lost and a location at which the connection to the server returned;
- determining that waypoints or data collection steps included in the data collection mission were missed during the autonomous navigation process between the location at which the connection to the server was lost and the location at which the connection to the server returned; and
- in response to determining that waypoints or data collection steps were missed, adjusting the connectivity-enabled navigation process to include the missed waypoints or data collection steps.

13. The method of claim 11, wherein executing, by the UAV, the connectivity-enabled navigation process comprises performing a reconciliation of the connectivity-enabled navigation process, the performing comprising:
- determining a location at which the connection to the server was lost and a location at which the connection to the server returned;
- determining that additional waypoints or data collection steps included in the data collection mission were performed during the autonomous navigation process; and
- in response to determining that additional waypoints or data collection steps were performed during the autonomous navigation process, adjusting the connectivity-enabled navigation process to remove the additional waypoints or data collection steps.

14. The method of claim 1, further comprising:
- storing, by the UAV, data collected during the autonomous navigation process; and
- uploading, by the UAV, the stored data to the server when the connection to the server is recovered.

15. The method of claim 1, wherein the autonomous navigation process further navigates the datacenter using path finding performed by an artificial intelligence layer included in the UAV.

16. A system comprising:
an unmanned aerial vehicle (UAV) in data communication with a server, the UAV comprising:
at least one onboard imaging system;
a data processing apparatus; and
a non-transitory computer readable storage medium in data communication with the data processing apparatus and storing instructions executable by the data processing apparatus and upon such execution cause the data processing apparatus to perform operations comprising:
executing, within a datacenter and by an unmanned aerial vehicle (UAV) in data communication with a server, a connectivity-enabled navigation process to collect data from multiple predetermined target locations in the datacenter as part of an imaging and sensing data collection mission;
determining, during execution of the connectivity-enabled navigation process and by the UAV, that connection to the server is lost so that the connectivity-enabled navigation process cannot be continued; and
in response to determining that connection to the server is lost, executing, by the UAV, an autonomous navigation process until the connection to the server is recovered or the data collection mission is complete, wherein the autonomous navigation process navigates the datacenter using visual tags positioned in the datacenter and executing the autonomous navigation process comprises:
searching, using an onboard imaging system, for a visual tag positioned in the datacenter;
successfully identifying, by the onboard imaging system, a visual tag;
in response to successfully identifying, by the onboard imaging system, the visual tag, extracting metadata from the visual tag to determine properties of the visual tag, the properties specifying a location of the visual tag within the datacenter;
determining, by the UAV and using the properties of the visual tag, that the location of the visual tag is relevant to the data collection mission and that imaging and sensing data has not been collected from a location within a predetermined distance of the visual tag during the data collection mission;
in response to determining that the location of the visual tag is relevant to the data collection mission and that imaging and sensing data has not been collected from a location within a predetermined distance of the visual tag during the data collection mission, flying the UAV towards the visual tag; and
collecting the imaging and sensing data whilst flying towards the visual tag.

17. A computer-readable storage medium comprising instructions stored thereon that are executable by a processing device and upon such execution cause the processing device to perform operations comprising:
executing, within a datacenter and by an unmanned aerial vehicle (UAV) in data communication with a server, a connectivity-enabled navigation process to collect data from multiple predetermined target locations in the datacenter as part of an imaging and sensing data collection mission;
determining, during execution of the connectivity-enabled navigation process and by the UAV, that connection to the server is lost so that the connectivity-enabled navigation process cannot be continued; and
in response to determining that connection to the server is lost, executing, by the UAV, an autonomous navigation process until the connection to the server is recovered or the data collection mission is complete, wherein the autonomous navigation process navigates the datacenter using visual tags positioned in the datacenter and executing the autonomous navigation process comprises:
searching, using an onboard imaging system, for a visual tag positioned in the datacenter;
successfully identifying, by the onboard imaging system, a visual tag;
in response to successfully identifying, by the onboard imaging system, the visual tag, extracting metadata from the visual tag to determine properties of the visual tag, the properties specifying a location of the visual tag within the datacenter;
determining, by the UAV and using the properties of the visual tag, that the location of the visual tag is relevant to the data collection mission and that imaging and sensing data has not been collected from a location within a predetermined distance of the visual tag during the data collection mission;
in response to determining that the location of the visual tag is relevant to the data collection mission and that imaging and sensing data has not been collected from a location within a predetermined distance of the visual tag during the data collection mission, flying the UAV towards the visual tag; and
collecting the imaging and sensing data whilst flying towards the visual tag.

* * * * *